Nov. 6, 1928.
H. D. HUKILL
1,690,302
BRAKE SHOE CONSTRUCTION
Filed March 2, 1927
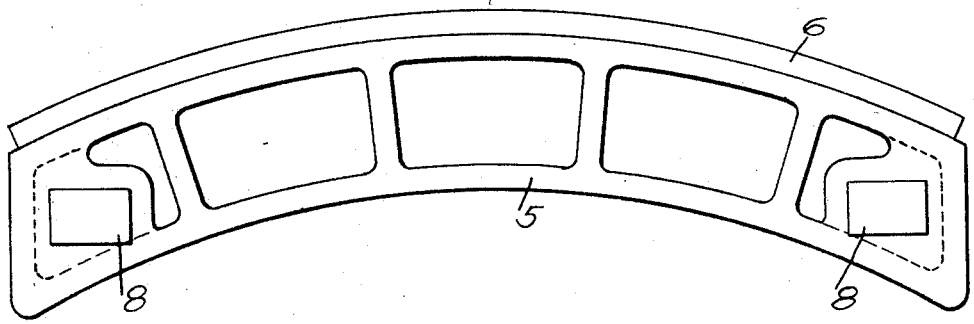
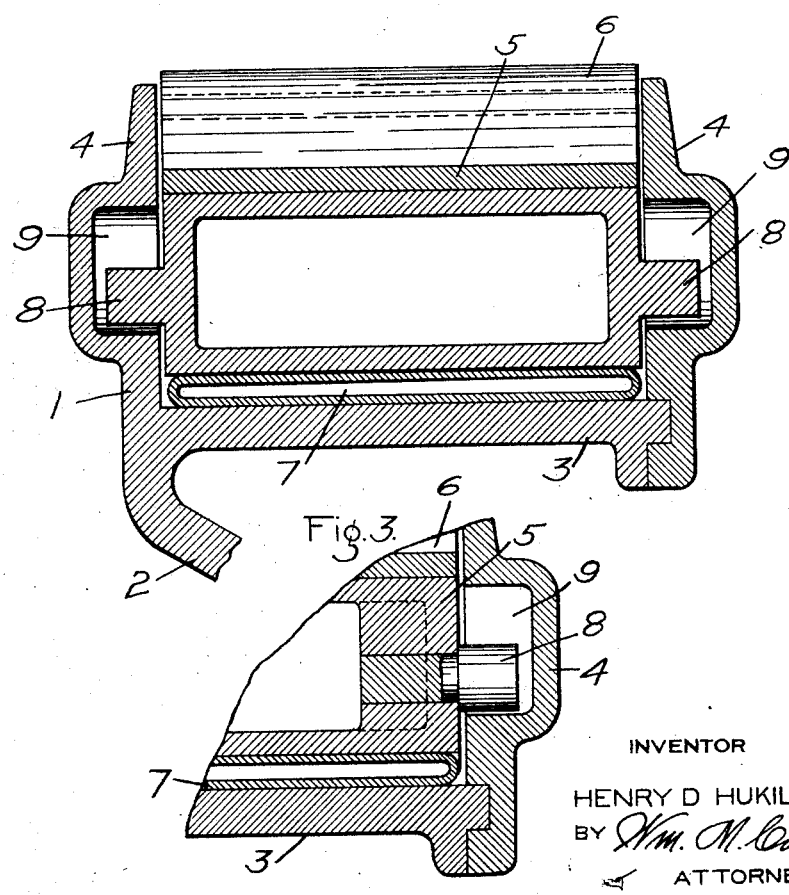
INVENTOR
HENRY D HUKILL
BY Wm. M. Cady
ATTORNEY Patented Nov. 6, 1928.

1,690,302

UNITED STATES PATENT OFFICE.

HENRY D. HUKILL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed March 2, 1927. Serial No. 171,923.

This invention relates to brakes for automotive vehicles and more particularly to that type of brake in which a plurality of radially arranged arcuate brake shoes are movable outwardly into engagement with the inner braking surface of the brake drum to apply the brake and movable in the opposite direction to release the brake, and has for an object the provision of means for guiding such shoes in their outward and inward movement and to prevent, at all times, the shoes from rotating, i. e. from moving in directions around the brake support upon which the shoes are mounted.

Another object of the invention is to provide the radially arranged brake shoes of an automotive vehicle brake with projections adapted to cooperate with a brake support or spider to hold such shoes in their proper operative positions against movement in directions around the support and also to permit these shoes to be moved into or out of braking relation with the interior braking surface of a brake drum.

Referring to the drawings in which like reference characters refer to like parts, Fig. 1 is a sectional view through a portion of an automotive vehicle brake embodying the invention; Fig. 2 is a side elevational view of one of the brake shoes; and Fig. 3 is a sectional view of a portion of the brake embodying a modification of the invention.

Referring now in detail to the drawing, the reference character 1 indicates a brake support which may be secured to or formed integral with the axle housing (not shown) or any other suitable part of an automotive vehicle. This support when applied to a vehicle is positioned within a brake drum (not shown) and comprises a main web 2 and a horizontally disposed web 3, both of such webs being preferably integral. Extending outwardly from the web 3 there are spaced flanges 4, one of which is preferably integral with the support and the other is preferably separate therefrom and suitably secured thereto. Between the flanges 4, brake shoes 5 are provided which are arcuate in form and are arranged radially of the support, and are each provided with the usual brake lining 6 which is adapted to frictionally engage the braking surface of the brake drum (not shown). These shoes move outwardly to effect an application of the brakes and inwardly to effect a release thereof, and any suitable means may be employed for so operating the shoes, the means illustrated in the drawing comprising an expansible tube 7 which is mounted on the web 3 of the brake support 1, and upon this tube the shoe seats. This tube is expanded by fluid from any suitable pressure source, and when expanding causes the shoes to move outwardly so that the lining 6 will engage the hereinbefore mentioned brake drum. Upon the release of the pressure, the tube will collapse and the shoes will be returned to their normal released positions. For the purpose of guiding the shoes as they operate and for the purpose of preventing endwise or rotary movement of the shoes relative to the brake support 1, each brake shoe is provided with projections 8 extending outwardly beyond the sides of the shoe into slots 9 formed in the flanges 4. It will be noted that free outward and inward movement of the shoes will be permitted and that rotary or endwise movement of the shoes is prevented by the projections engaging the sides of the slots 9. In the preferred form of the invention as illustrated in Figs. 1 and 2 of the drawing, the projection 8 has been shown integral with the shoe and of angular form, but it will be understood that this projection may be of circular or of any other suitable form. In Fig. 3 a modification of the projection 8 is illustrated, which projection comprises a member separate from the shoe and removably secured thereto. In this form the projection may be removed and replaced, should this be found desirable.

Having now described my invention, what I claim as new and desire to secure by Letters Patent, is:—

1. In a brake for automotive vehicles, the combination with a support therefor, of brake shoes mounted on said support and movable radially relative thereto, and projections on both sides of each end of each of said shoes adapted to interlock with said support to prevent rotary movement of said shoes.

2. In a brake for automotive vehicles, the combination with a support therefor, of brake shoes mounted on said support and movable radially relative thereto, and integral projections on both sides of each end of each of said shoes adapted to interlock with said support to prevent rotary movement of said shoes.

3. In a brake for automotive vehicles, a support for a portion of said brake, flanges projecting outwardly from said support and having slots formed therein, brake shoes, and projections on both sides of each end of each of said shoes adapted to extend into said slots and there engage said support to prevent rotary movement of said shoes.

4. In a brake for automotive vehicles, a support for a portion of said brake, brake shoes, and means integral with said shoes projecting laterally from the sides thereof adapted to engage said support to prevent rotary movement of said shoes.

5. In a brake for automotive vehicles, a support for a portion of said brake, spaced flanges projecting from said support, brake shoes, and means integral with and projecting laterally from the sides of said shoes adapted to engage said flanges to prevent rotary movement of said shoes relative to said support.

In testimony whereof I have hereunto set my hand.

HENRY D. HUKILL.